United States Patent [19]

Heibel et al.

[11] Patent Number: 5,022,717
[45] Date of Patent: Jun. 11, 1991

[54] PRESSURE CONTROL UNIT, ESPECIALLY FOR MOTOR VEHICLE BRAKE SYSTEMS

[75] Inventors: Helmut Heibel, Moschheim; Leo Gilles, Koblenz, both of Fed. Rep. of Germany

[73] Assignee: Lucas Industries public limited company, Birmingham, England

[21] Appl. No.: 448,534

[22] Filed: Dec. 11, 1989

[30] Foreign Application Priority Data

Dec. 12, 1988 [DE] Fed. Rep. of Germany ... 8815426[U]
Dec. 12, 1988 [DE] Fed. Rep. of Germany ... 8815427[U]

[51] Int. Cl.$^5$ .................. B60T 8/34; B60T 13/68; B60T 8/38; G05D 16/20
[52] U.S. Cl. .................. 303/119; 303/113; 439/34
[58] Field of Search ........... 303/119, 116, 113, 10; 439/34, 13, 544, 638, 736; 188/344, 181; 137/487.5, 884, 596.17; 251/129.21, 129.06

[56] References Cited

U.S. PATENT DOCUMENTS

| | | | |
|---|---|---|---|
| 4,561,701 | 12/1985 | Fujii et al. | 303/119 |
| 4,690,465 | 9/1987 | Takeda et al. | 303/119 |
| 4,697,863 | 10/1987 | Galloway et al. | 439/736 |
| 4,705,324 | 11/1987 | Kervagoret | 303/119 |
| 4,813,448 | 3/1989 | Leiber | 303/113 X |
| 4,929,038 | 5/1990 | Reinartz et al. | 303/119 |

FOREIGN PATENT DOCUMENTS 3701019 7/1988 Fed. Rep. of Germany.

Primary Examiner—Douglas C. Butler
Attorney, Agent, or Firm—Scrivener and Clarke

[57] ABSTRACT

A valve block (10) includes fluid passages (12), valves (14), and connections (30,32,34) for fluid operated devices. Electromagnets (36) are attached to the valve block (10) for actuating the valves (14). A hood (40) covering the electromagnets (36) is placed on the valve block (10). An external plug group (42) is arranged at the hood (40) and comprises plugs (44) which are accessible from outside and serve for connection to sensors and the like. A second plug group (46) including plugs (48) is arranged within the hood (40), the plugs thereof being connected to the plugs (44) of the external plug group (42). A third plug group (50) including plugs (52) is arranged at the valve block (10), the plugs thereof being adapted for connection to the plugs (48) of the second plug group (46) by donning of the hood (40). The electromagnets (36) are connected to the plugs (52) of the third plug group (50) by a conductor arrangement (56). The hood (40) encloses a space (53) in which electronic components are received.

13 Claims, 4 Drawing Sheets

PRESSURE CONTROL UNIT, ESPECIALLY FOR MOTOR VEHICLE BRAKE SYSTEMS

The invention relates to a pressure control unit, especially for motor vehicle brake systems, comprising a valve block which includes fluid passages, valves, and connections for fluid operated devices; electromagnets attached to the valve block for actuating the valves; a hood placed on the valve block and covering the electromagnets; an external plug group arranged at the hood and including plugs accessible from outside to connect to sensors and the like; and electrical connections between the electromagnets and corresponding plugs of the external plug group.

In a known pressure control unit of this kind (DE 37 01 019 A1) the plugs of the external plug group are connected to the electromagnetic valves by a connector foil of a length which is selected such that the hood can be pivoted by up to 180° about its edge adjacent the external plug group. That provides the possibility of making in one common operation the solder connections between the connector foil and the inner ends, with respect to the hood, of the external plug group, on the one hand, and the electromagnetic valves, on the other hand.

It is an object of the invention to provide a pressure control unit which can be adapted with a minimum of expenditure to different requirements, especially upon installation into motor vehicles including different equipment.

The object is met, in the case of one embodiment of the invention, starting from a pressure control unit of the kind defined initially, in that a second plug group including plugs is disposed within the hood, the plugs thereof being connected to the plugs of the external plug group, a third plug group including plugs is disposed at the valve block, the plugs thereof being adapted to be connected to the plugs of the second plug group by donning of the hood, the electrical connections comprise a conductor arrangement linking the electromagnets with the plugs of the third plug group, and a space is provided inside the hood to receive electronic components.

With a second embodiment of the invention and likewise starting from a pressure control unit of the kind specified initially, the object is met in that a second plug group including plugs is disposed within the hood, the plugs thereof being connected to the plugs of the external plug group, plugs are arranged at the electromagnets for pluging connection to the plugs of the second plug group by donning of the hood on the valve block, and a space is provided inside the hood to receive electronic components.

In this manner the valve block including all the valves installed in or attached to it, electromagnets, and so on can be paired with a hood which is selected, as required, from a more or less ample number of hoods furnished with different electronic components. Motor vehicles, for example, thus can be equipped or retrofitted, as desired, with anti-lock systems and/or anti-slip control laid out for different control characteristics. Repair work also is facilitated by the invention.

Advantageous further developments are presented in the subclaims.

The invention will be described further, by way of example, with reference to the accompanying drawings, in which.

Figure 1:
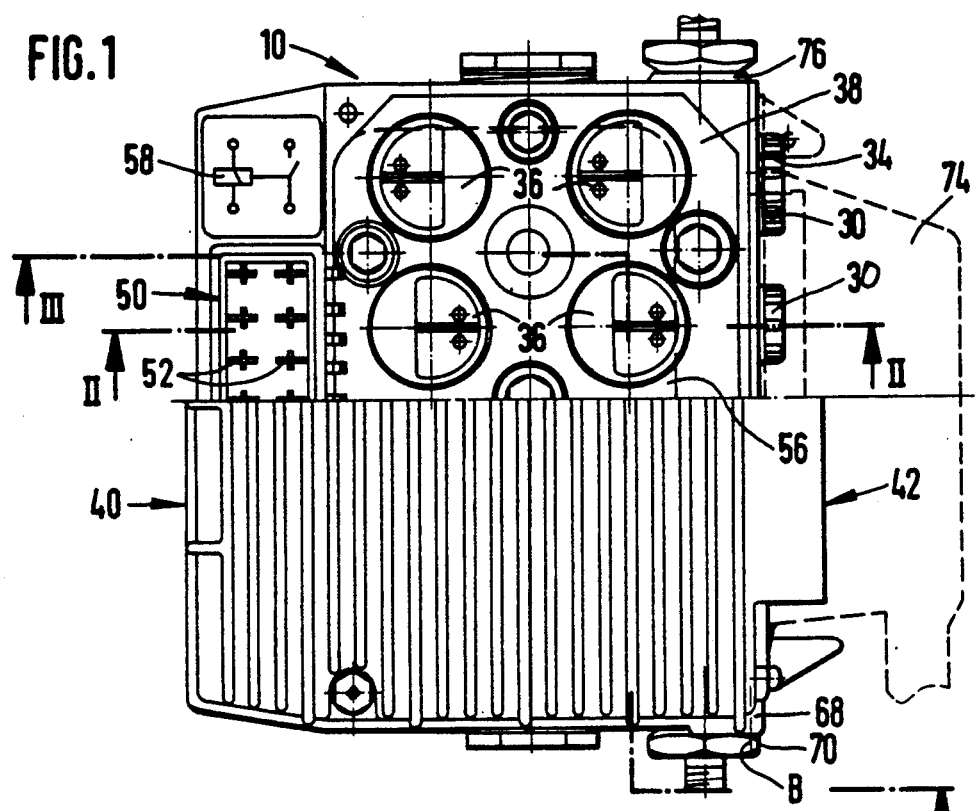
FIG. 1 is a top plan view of a first pressure control unit according to the invention, the hood being removed in one half.
Figure 2:
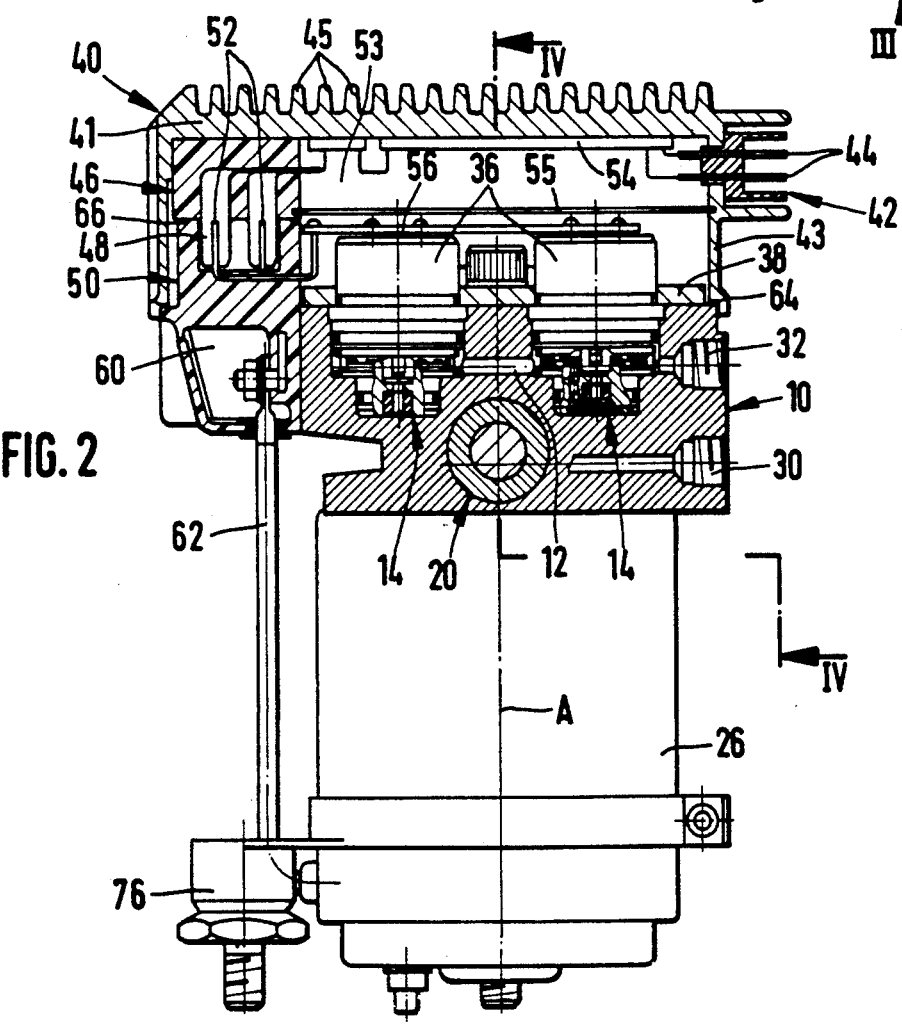
FIG. 2 is a sectional elevation along line II—II of FIG. 1.
Figure 3:
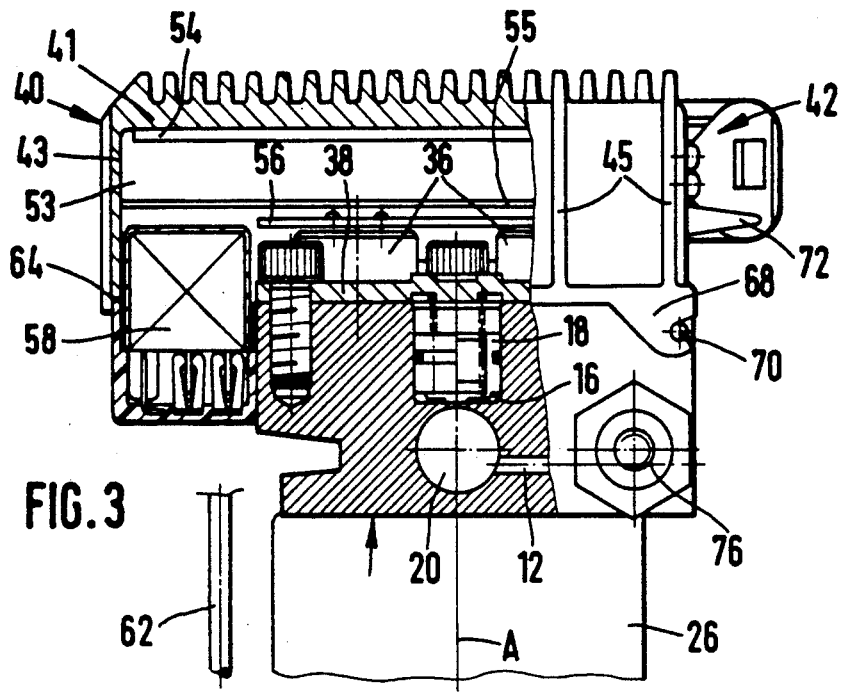
FIG. 3 is a sectional elevation along line III—III of FIG. 1.
Figure 4:
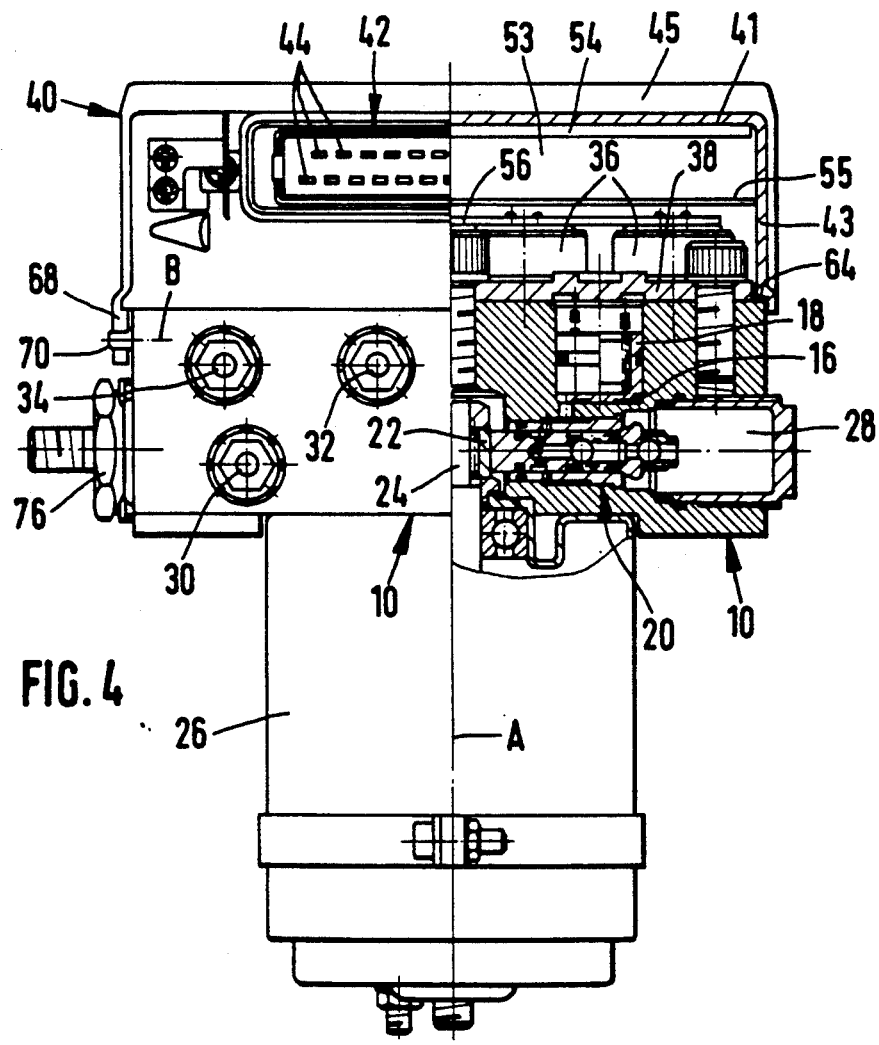
FIG. 4 is, a lateral view, partly in section along line IV—IV of FIG. 2.
Figure 5:
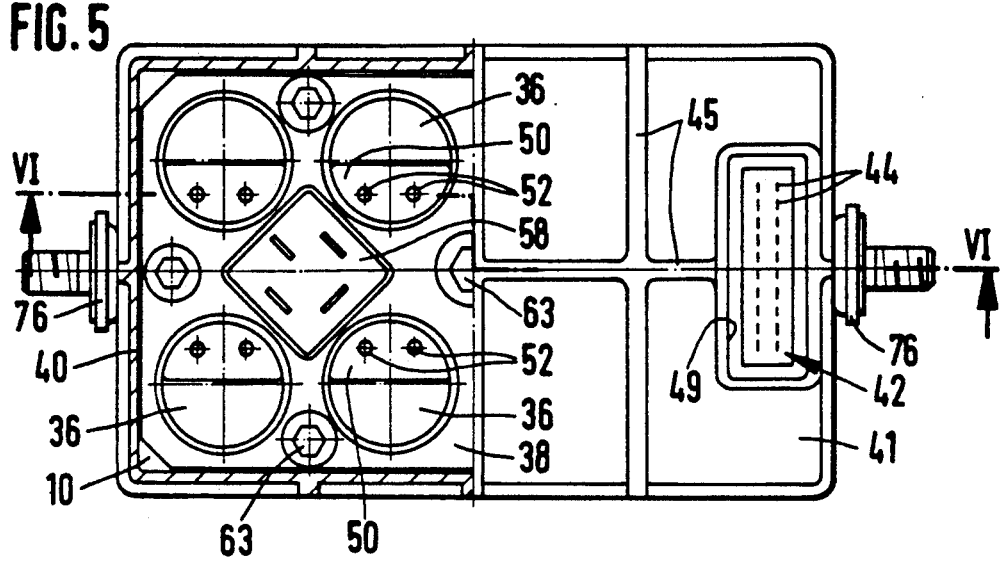
FIG. 5 is a top plan view of a second pressure control unit according to the invention, the hood being removed in one half.
Figure 6:
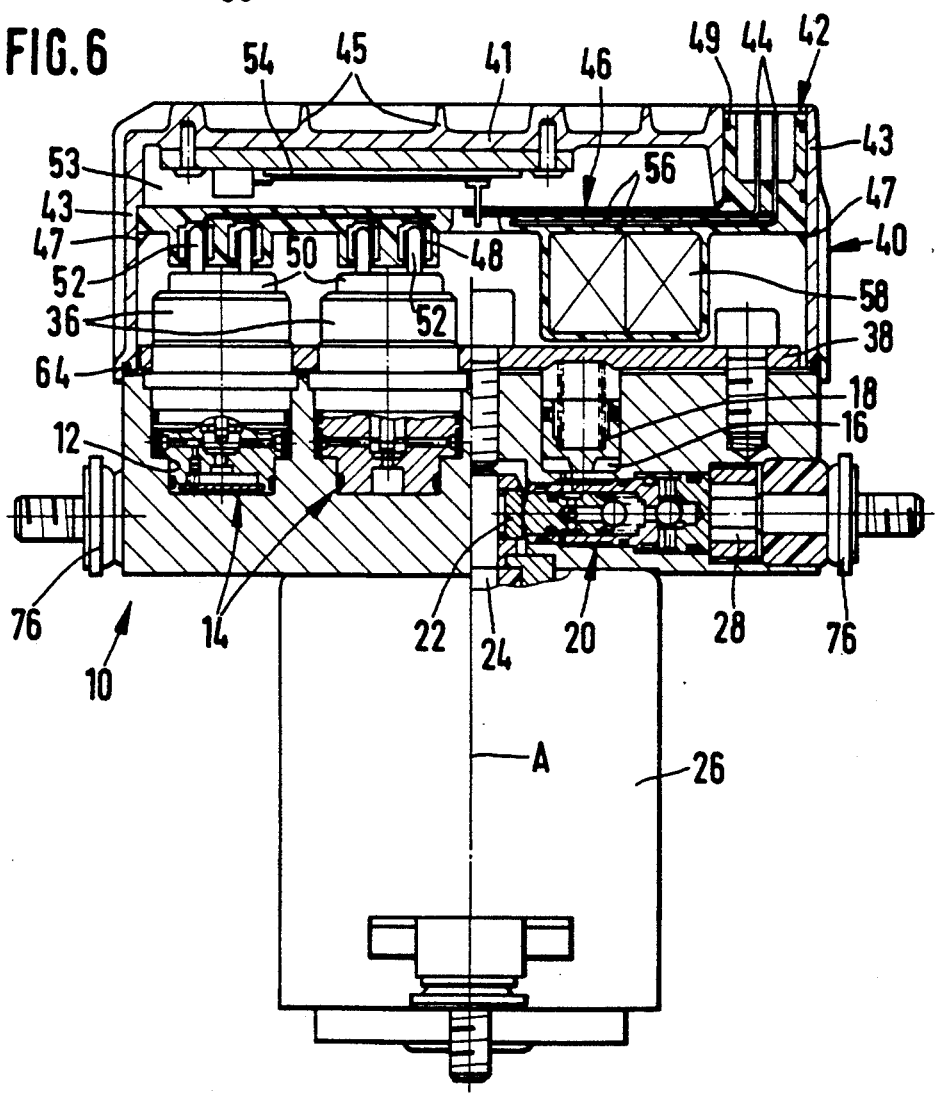
FIG. 6 is a sectional elevation along line VI—VI of FIG. 5.

Each of the pressure control units shown comprises a valve block 10 with passages 12, one of which is illustrated by way of example in FIG. 2. This passage 12 is associated with a pair of valves 14 installed in the valve block 10. Altogether the valve block 10 includes eight valves 14 which are installed parallel to an axis of symmetry A, interconnected in pairs by a passage 12 each, and combined in two groups of four valves 14 each. Each of these groups is coordinated with one of two brake circuits of a braking system in a motor vehicle.

The valve block 10 includes two relief chambers 16 each associated with a group of four valves and each housing a spring loaded expansion piston 18. Each relief chamber 16 is connected to either one of two pumps 20 arranged diametrically opposite each other with respect to the axis of symmetry A of the valve block 10 and adapted to be driven by a common cam member 22. The cam member 22 is supported on the shaft 24 of an electric motor 26 built on to the valve block 10.

It is the task of each of the two pumps 20 to convey brake fluid from the corresponding relief chamber 16 into a corresponding pressure chamber 28 which can be caused to communicate with a double circuit master cylinder through a connection 30. Of the two valve pairs of each group of four valves 14 one valve pair can be connected, through a connection 32, to a wheel brake cylinder of a front wheel brake, whereas the other valve pair of the same group can be caused to communicate with a wheel brake cylinder of a rear wheel brake through a connection 34. The pressure in the wheel brake cylinders thus can be controlled by way of the valves 14. An electromagnet 36 each is associated with each valve 14 for actuation of the same, the electromagnets being attached to and partly installed in the valve block 10. The total of eight electromagnets 36 are carried by a common plate 38 which is fastened to the valve block 10 by screw connections.

The space above the electromagnets 36 is closed by a hood 40 which is placed on the valve block 10 and is made, for instance, of aluminum. The hood 40 has an end wall 41 remote from the valve block 10 and four side walls 43 at right angles with respect to the end wall. An external, elongated plug group 42 including a plurality of plugs 44 is inserted in one of the side walls 43. The plugs 44 can be connected to sensors which monitor the rotation of the respective associated wheel of the vehicle. Cooling and reinforcing fins 45 are formed at the outer side of the end wall 41 and of the side walls 43.

With the embodiment shown in FIGS. 1 to 4, a second elongated plug group 46 likewise comprising a plurality of plugs 48 extends along that side wall 43 of the hood 40 which is remote from the external plug group 42, at the inside of the hood 40. A third elongated plug group 50 is associated with the second plug group 46. It is fastened to the valve block 10 and furnished with plugs 52 which are complementary to the plugs 48. When the hood 40 is donned on the valve block 10, as illustrated, each one of plugs 52 engages one of plugs 48.

As shown in FIGS. 1 to 4, a microprocessor 54 is arranged at the inside of the end wall 41 of the hood 40 in a separate space 53. It is cast in synthetic resin for sealing purposes. This space 53 is separated by a partition 55 from the space which houses the electromagnets 36. The partition 55 extends parallel to the top of the hood 40 and, like the hood, at right angles with respect to the axis of symmetry A. The partition is retained in grooves formed at the inner side of the hood 40 and in the second plug group 46. The partition 55 protects the microprocessor from the heat irradiated by the electromagnets 36.

The microprocessor 54 is connected to plugs 44 of the external plug group 42 and to plugs 48 of the second plug group 46 as well. The electromagnets 36 are firmly connected to a pair each of plugs 52 of the third plug group 50 by a common conductor arrangement 56. As shown in FIGS. 1 to 4, the conductor arrangement 56 is a circuit board extending parallel to the partition 55, and thus also perpendicular to the axis of symmetry A. Some of the plugs 52 are connected by fixed wiring to relays 58 housed in a portion of the third plug group 50 which is free of plugs 52.

A terminal space 60 is formed in the third plug group 50 below the plugs 52 and separate from the same, as illustrated in FIGS. 1 to 4. A line 62 connected to ground and a pair of further leads (not shown) for connection to the two poles of a motor vehicle battery issue from the terminal space.

With all the embodiments shown, a seal 64 passes along the edge of the hood 40 to provide sealing with respect to the valve block 10. If one of the valves 14 should begin to leak, however, there is a discharge passage in the hood 40 or in the valve block 10 so that no larger quantity of brake fluid can accumulate inside the hood 40. Irrespective of the seal 64, the two plug groups 46 and 50 are sealed from the remainder of the space inside the hood 40 by a separate seal disposed between them whereby the plugs 48 and 52 are protected reliably against any contamination or corrosion as long as the hood 40 is fastened on the valve block 10.

As illustrated in FIGS. 1 to 4, the hood 40 has a pair of hinge projections 68 in the vicinity of the external plug group 42. They are each locked to a pin 70 which projects from the valve block 10. The two pins 70 define a pivot axis B about which the hood 40 can be pivoted for opening and closing. The swinging of the hood 40 into open position is limited to a little more than 90° by a stop 72 formed at the hood. When opening the hood, therefore, a plug unit 74 indicated by discontinuous lines in FIG. 1 and plugged on to the external plug group 42, may remain in place. If the hood 40, possibly together with the plug unit 74, is to be removed entirely from the valve block 10, the hinge projections 68 can be detached from the pins 70.

All the pressure control units shown are provided with rubber spring members 76 by means of which the valve block 10 can be fastened, for instance, to the body of a motor vehicle.

In the case of the pressure control units shown in FIGS. 5 to 8 an internal plug group 46 extends inside the hood 40 in parallel with the end wall 41 thereof. It is of plate-shaped flat configuration and snapped behind projections 47 formed at the inner walls of the hood 40. It likewise comprises a plurality of plugs 48. The external plug group 42 is formed integrally with the internal plug group 46 and is pushed through a recess 49 in the end wall 41 from the inside of the hood 40, thereby tightly sealing the recess 49.

The plugs 48 are connected in electrically conductive manner, either directly or indirectly, by a conductor 56 each formed integrally in the plug group 46 to a respective one each of the plugs 44. Plug heads 50 formed at the electromagnets 36 and each having two plugs 52 which are complementary to the plugs 48 are associated with the internal plug group 46. When the hood 40 is placed on the valve block 10, as illustrated, each of the plugs 52 engages in one of the plugs 48.

Inside the hood 40 the internal plug group 46 sets aside a space 53 which is separated from the electromagnets 36 and protected against the heat they irradiate. A microprocessor 54 is fixed at the inner side of the end wall 41 of the hood 40 in the space 53. It is cast in synthetic resin for sealing purposes. The microprocessor 54 is connected both to plugs 44 of the external plug group 42 and to plugs 48 of the internal plug group 46. Some of the plugs 44 are firmly wired to two relays 58 fixed to the internal plug group 46 and each protruding into a space enclosed by four electromagnets 36.

As may be seen in FIGS. 5 to 8, the hood 40 is fastened to the valve block 10 by srews 63 which are located such that each electromagnet 36 lies as best as possible in the middle between two screws 63.

Figure 7:
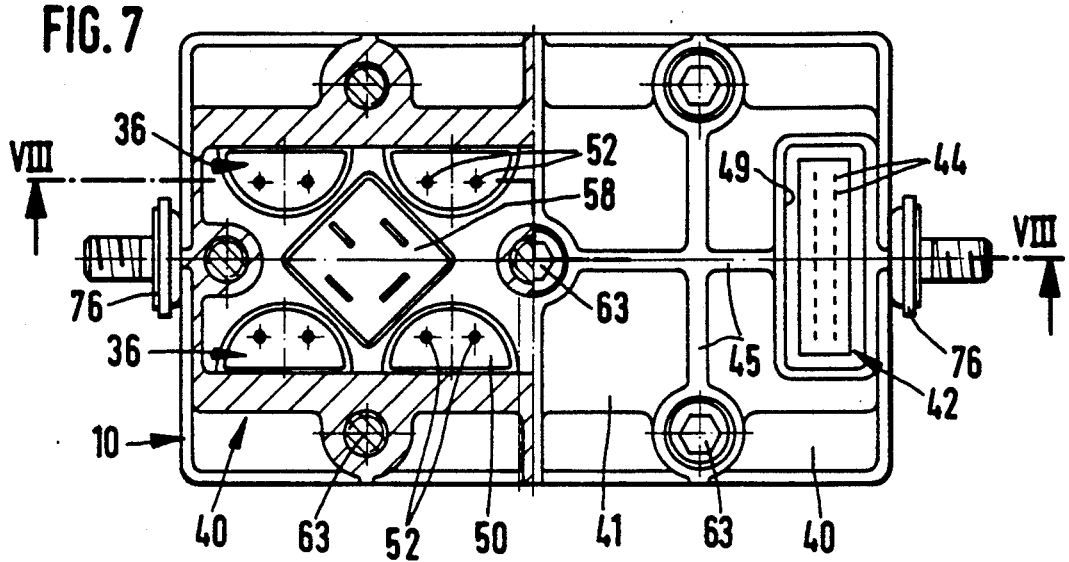
FIG. 7 is a top plan view of a third pressure control unit according to the invention, the hood being removed in one half.
Figure 8:
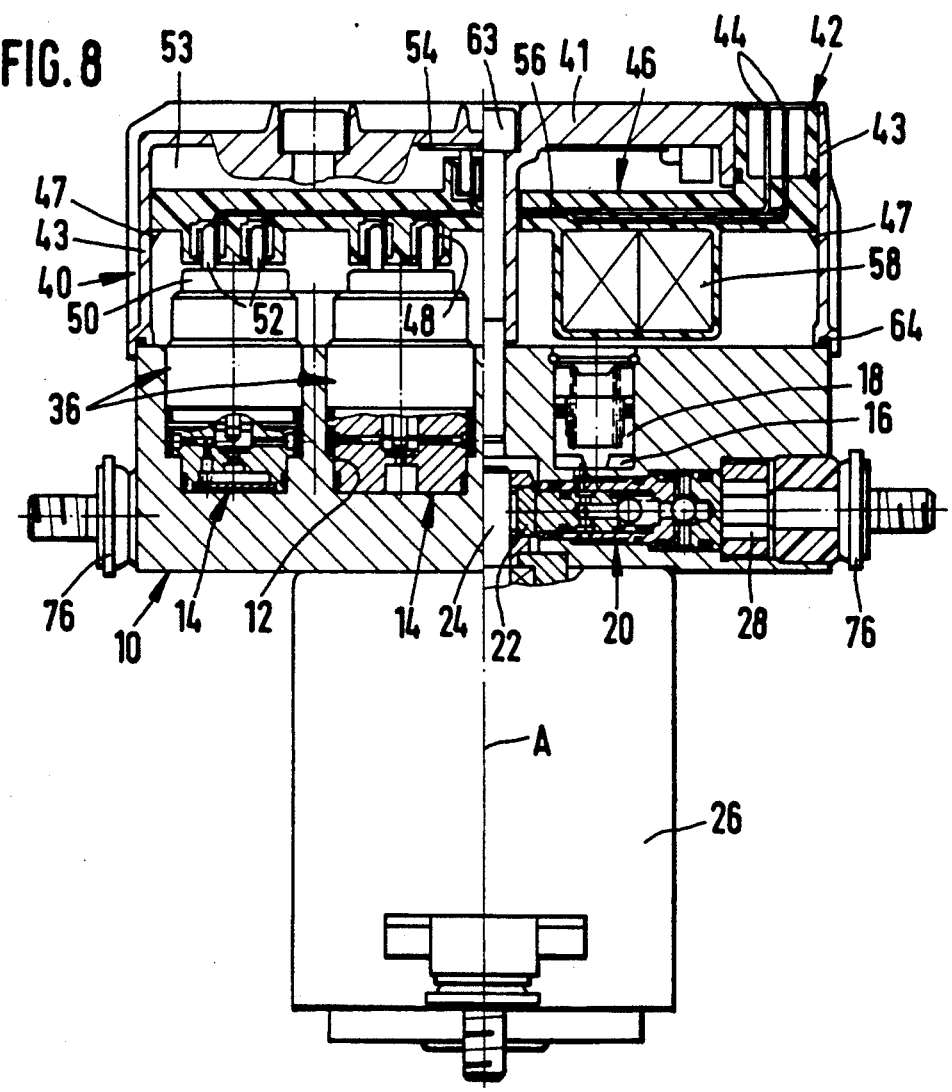
FIG. 8 is a sectional elevation along line VIII—VIII of FIG. 7.

The embodiment of FIGS. 7 and 8 shows the hood 40 to be designed so that the hood itself will keep the electromagnets 36 in place. For this reason the plate 38 to be seen in FIGS. 1 to 6 is omitted in FIGS. 7 and 8.

What is claimed is:

1. A pressure control unit, especially for motor vehicle brake systems, comprising a valve block (10) which includes fluid passages (12), valves (14), and connections (30, 32, 34) for fluid operated devices, electromagnets (36) attached to the valve block (10) for actuating the valves (14), a hood (40) placed on the valve block (10) and covering the electromagnets (36), an external plug group (42) arranged at the hood (40) and including plugs (44) accessible from outside to connect to sensors and the like, and electrical connections between the electromagnets (36) and corresponding plugs (44) of the external plug group (42), characterized in that a second plug group (46) including plugs (48) is disposed within the hood (40), the plugs (48) of said second group being connected to the plugs (44) of the external plug group (42), a third plug group (50) including plugs (52) is disposed at the valve block (10), the plugs (52) of said third group being adapted to be connected to the plugs (48) of the second plug group (46) by donning of the hood (40), the electrical connections comprise a conductor arrangement (56) linking the electromagnets (36) with the plugs (52) of the third plug group (50), and a space (53) is provided inside the hood (40) to receive electronic components.

2. The pressure control unit as claimed in claim 1, characterized in that the external plug group (42) and the second plug group (46) are connected to a microprocessor (54) disposed at the inside of the hood (40).

3. The pressure control unit as claimed in claim 1, characterized in that the external plug group (42) and the second plug group (46) are arranged at opposite ends of the hood (40).

4. The pressure control unit as claimed in claim 3, characterized in that the hood (40) is supported at the valve block (10) for pivoting about an axis (B) which is located near and parallel to the external plug group (42).

5. The pressure control unit as claimed in claim 1, characterized in that the second and third plug groups (46, 50) are sealed in common against the space in which the electromagnets (36) are housed, when the hood (40) is closed.

6. The pressure control unit as claimed in claim 1, characterized in that the space (53) receiving the electronic components is separated from the electromagnets (36) by a partition (55).

7. The pressure control unit as claimed in claim 6, characterized in that the partition (55) is retained in grooves formed in the hood (40) and in the second plug group (46).

8. A pressure control unit, especially for motor vehicle brake systems, comprising
a valve block (10) which includes fluid passages (12), valves (14), and connections (30, 32, 34) for fluid operated devices,
electromagnets (36) attached to the valve block (10) for actuating the valves (14),
a hood (40) placed on the valve block (10) and covering the electromagnets (36),
an external plug group (42) arranged at the hood (40) and including plugs (44) accessible from outside to connect to sensors and the like, and
electrical connections between the electromagnets (36) and corresponding plugs (44) of the external plug group (42), characterized in that
an internal plug group (46) including plugs (48) is disposed within the hood (40), the plugs (48) of the internal plug group (46) being connected to the plugs (44) of the external plug group (42),
plugs (52) are arranged at the electromagnets (36) for plugging connection to the plugs (48) of the internal plug group (46) by donning of the hood (40) on the valve block (10), and
a space (53) is provided inside the hood (40) to receive electronic components.

9. The pressure control unit as claimed in claim 8, characterized in that the external plug group (42) and the internal plug group (46) are connected to a microprocessor (54) disposed at the inside of the hood (40).

10. The pressure control unit as claimed in claim 9, characterized in that the hood (40) encloses a space (53) in which the microprocessor (54) is received and which is separated from the electromagnets (36) by the internal plug group (46).

11. The pressure control unit as claimed in claim 8, characterized in that the external plug group (42) and the internal plug group (46) are made in one piece.

12. The pressure control unit as claimed in claim 8, characterized in that the internal plug group (46) is fixed in the hood (40) by snapping behind internal projections (47) inside the same.

13. The pressure control unit as claimed in claim 8, characterized in that at least one relay (58) is fixed to the internal plug group (46) for control of an electric motor (26) attached to the valve block (10) which motor drives pumps (20) built into the valve block (10).

* * * * *